US006547075B1

(12) United States Patent
Usui

(10) Patent No.: US 6,547,075 B1
(45) Date of Patent: Apr. 15, 2003

(54) PACKAGING STRUCTURE OF PLANOGRAPHIC PRINTING PLATES AND INTERNAL PACKAGING MATERIAL FOR PLANOGRAPHIC PRINTING PLATES

(75) Inventor: Takayuki Usui, Shizuoka-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/650,727

(22) Filed: Aug. 30, 2000

(30) Foreign Application Priority Data

Aug. 30, 1999 (JP) .......................................... 11-243530

(51) Int. Cl.[7] .......................... B65D 85/00; G03B 42/04
(52) U.S. Cl. ..................... 206/455; 206/524.6; 378/182
(58) Field of Search ................................ 206/455, 449, 206/524.6; 378/182, 184, 185, 187, 188

(56) References Cited

U.S. PATENT DOCUMENTS

| | | | | |
|---|---|---|---|---|
| 1,434,605 A | * 11/1922 | Gauch | 206/449 |
| 2,062,179 A | * 11/1936 | Hunter | 206/524.6 |
| 2,802,950 A | * 8/1957 | Gordon et al. | 378/182 |
| 3,741,386 A | * 6/1973 | Schmidt | 206/455 |
| 3,777,884 A | * 12/1973 | Hedin | 206/455 |
| 4,408,340 A | * 10/1983 | Bauer | 378/187 |
| 4,915,229 A | * 4/1990 | Yamada et al. | 206/45 |
| 5,649,411 A | * 7/1997 | Dirx | 206/455 |
| 5,729,962 A | * 3/1998 | Dirx | 53/461 |
| 6,026,955 A | * 2/2000 | Dirx | 206/455 |

FOREIGN PATENT DOCUMENTS

| | | |
|---|---|---|
| EP | 0 718 683 A2 | 6/1996 |
| EP | 0 744 344 A1 | 11/1996 |
| EP | 0 955 564 A2 | 11/1999 |
| JP | 9-111697 | 4/1997 |
| JP | 10-16946 | 1/1998 |

OTHER PUBLICATIONS

Patent Abstract of Japan 09111697 Apr. 28, 1997.
Patent Abstract of Japan 10016946 Jan. 20, 1998.

* cited by examiner

*Primary Examiner*—Bryon P. Gehman
(74) *Attorney, Agent, or Firm*—Sughrue Mion, PLLC

(57) ABSTRACT

A packaging structure of planographic printing plates and an internal packaging material for the plates, which reliably protect the planographic printing plates from an external force, and which block the plates from light and keep the plates free from moisture; wherein the internal packaging material and an external packaging material are easily recycled. A stack of the planographic printing plates is internally packaged in the internal packaging material, whose light transmittance is a predetermined value or lower, and the stack is further packaged in the external packaging material. Light coming from the exterior of the closed external packaging material to the interior thereof becomes faint, and moreover, the planographic printing plates are prevented from accidental exposure due to a light-blocking property of the internal packaging material. In order to more reliably protect the planographic printing plates, the external packaging material has a predetermined strength, and further has a buffering property against changes in temperature and humidity.

15 Claims, 10 Drawing Sheets

PACKAGING STRUCTURE OF PLANOGRAPHIC PRINTING PLATES AND INTERNAL PACKAGING MATERIAL FOR PLANOGRAPHIC PRINTING PLATES

BACKGROUND OF THE INVENTION

1. Field of the Invention

The present invention relates to a packaging structure of planographic printing plates and an internal packaging material for the planographic printing plates. More specifically, the present invention relates to a packaging structure of planographic printing plates, which can block the planographic printing plates from light from the exterior and can protect the plates from an external force, and to an internal packaging material for the planographic printing plates, which can block the planographic printing plates from light from the exterior and can internally package the plates.

2. Description of the Related Art

In electrophotographic plate making methods in recent years, in order to facilitate automation of plate making processes, planographic printing plates such as photosensitive printing plates or thermosensitive printing plates have been widely used. The photosensitive printing plates have high photosensitivity, and thus, even if the plates are exposed to a slight amount of light within a visible light wavelength band, a change is caused in photosensitive layers thereof. Therefore, the photosensitive printing plates need to be blocked from light. Similarly, in the thermosensitive printing plates, thermosensitive layers thereof may be deteriorated by thermal energy of light striking thereon, or a sensitivity change may be caused by a reaction progress. Therefore, it is preferable that the thermosensitive printing plates are appropriately blocked from light. Further, if the photosensitive or thermosensitive printing plates are subjected to rapid changes in humidity and temperature, there is a drawback in that, for example, dewing is caused in the photosensitive or thermosensitive layers thereof and the layers are thereby deteriorated. Therefore, these printing plates need to be kept free from moisture.

Accordingly, from the time when the planographic printing plates are manufactured to the time when the plates are loaded into an automatic plate making machine or the like, the planographic printing plates are packaged in an internal packaging paper which has a light-blocking property and a moisture-proofing property (i.e., the property of keeping the plates packaged therein free from moisture). As the internal packaging paper, for example, an aluminum kraft paper, in which low density polyethylene is melted and applied at a thickness of about 13 $\mu$m on a kraft paper, and then aluminum foil having a thickness of about 6 $\mu$m is further adhered thereon, is used. A stack of products (a stack of the planographic printing plates) are packaged in this aluminum kraft paper, and thereafter, portions (so-called ear portions and top surface portions) of the aluminum kraft paper are fastened by an adhesive tape or other fastening means. Further, as the internal packaging paper, a paper in which low density polyethylene is adhered at a thickness of about 10–70 $\mu$m on the aluminum foil of this aluminum kraft paper, or a paper in which black polyethylene film is further adhered at a thickness of about 70 $\mu$m on this low density polyethylene so as to increase the light-blocking property and the moisture-proofing property, is also used.

However, this aluminum kraft paper cannot be recycled once it has been used, and since it becomes necessary to dispose of the paper by dumping it as industrial waste, or by incineration or the like, the disposal requires a high expense.

On the other hand, a light-blocking and moisture-proofing paper which has the required light-blocking and moisture-proofing properties without the aluminum foil adhered thereon, has been suggested (see Japanese Patent Application Laid-Open (JP-A) No. 9-111697). However, this light-blocking and moisture-proofing paper becomes expensive, because a light-blocking layer and a moisture-proofing layer must be provided on the surface thereof.

Moreover, each of the photosensitive printing plates and the thermosensitive printing plates is formed in a single thin plate, and thus, if there is a blemish or deformation in a corner, an edge, an interior or the like thereof, problems are easily caused. For example, an image may be unclear when the plate has been developed after light-exposure or the plate has been developed with heat, or ink may not be uniform when the image has been printed.

Therefore, in order to prevent such blemishes or deformations, a corrugated cardboard box, which protects the planographic printing plates from an external force and packages the plates, has been suggested (see Japanese Patent Application Laid-Open (JP-A) No. 10-16946).

As shown in FIG. 10, in a corrugated cardboard box 50, triangular tube-shaped bodies 54 are formed by bending two opposite sides of a bottom surface panel 52, and thereby the perpendicularity of the bottom surface panel 52 to side surface panels 56 and to facing panels 58 is strongly maintained. In this way, the corrugated cardboard box 50 is structured so as not to lose its shape due to the weight of its contents.

However, in this corrugated cardboard box 50, light comes inside from the vicinities of the triangular tube-shaped bodies 54, fastened portions of the corrugated cardboard, and the like. Accordingly, when the planographic printing plates are contained in the corrugated cardboard box 50, there is the danger that so-called accidental exposure (light fog) can occur in the planographic printing plates.

SUMMARY OF THE INVENTION

In consideration of the above facts, it is an object of the present invention to obtain a packaging structure of planographic printing plates, which can reliably protect the planographic printing plates from an external force, which can block the plates from light and keep the plates free from moisture, and which can be disposed of easily and inexpensively; and an internal packaging material for the planographic printing plates, which can reliably block the planographic printing plates from light.

A first aspect of the present invention is a packaging structure of planographic printing plates, the structure comprising: an internal packaging material, which is made from a material having a light transmittance of predetermined value or lower, and which internally packages the planographic printing plates; and an external packaging material, which externally packages the planographic printing plates that have been internally packaged in the internal packaging material, and which has a higher rigidity than the internal packaging material.

Namely, the planographic printing plates, which have been internally packaged in the internal packaging material, are externally packaged in the external packaging material which has a higher rigidity than the internal packaging material. Therefore, the planographic printing plates are protected from an external force, and thus, the plates are not deformed or blemished.

The external packaging material can block the planographic printing plates from light and keep the plates free from moisture to some extent by itself. As a result, in a state of being externally packaged in the external packaging material, only a minuscule amount of light enters through very small gaps in the external packaging material to the interior thereof.

Because the planographic printing plates are internally packaged in the internal packaging material which is structured of a material having a light transmittance of a predetermined value or lower, even if there is such light-leakage, the light does not reach the planographic printing plates, and thus, changes in the photosensitive or thermosensitive layers of the planographic printing plates are prevented.

Further, even if there is a large change in humidity outside the external packaging material, a change in humidity in the interior of the external packaging material is small, because the external packaging material functions as a buffer. In the interior of the internal packaging material, a small change in humidity in the interior of the external packaging material is further buffered. Therefore, problems resulting from changes in humidity, such as dewing and the like are not caused in the planographic printing plates, and thus, the photosensitive or thermosensitive layers thereof are not deteriorated.

In this manner, by using a combination of the internal packaging material and the external packaging material, the planographic printing plates are reliably blocked from light and kept free from moisture such that the quality thereof is not effected. As the internal packaging material, any materials having a light transmittance of a predetermined value or lower can be used. Accordingly, a general paper or the like, which can be easily disposed of, can be used in place of the conventional aluminum kraft paper or the like, and thus, the planographic printing plates can be packaged at a low cost.

As long as the above-described conditions are satisfied, the material forming the internal packaging material is not particularly limited. For example, a general paper which can be recycled is preferably used. As a result, because the used internal packaging material can be recycled as a recyclable material, the planographic printing plates can be packaged without wasting resources. Examples of the general paper which can be recycled can include recyclable general paper, to which a layer or structure having a light-blocking or moisture-proofing effect is not particularly provided or attached.

A specific value of the light transmittance of the internal packaging material is determined based upon the sensitivity of the photosensitive or thermosensitive layers of the planographic printing plates, the intensity of light filtering in through gaps in the external packaging material and the like. However, the planographic printing plates can be more reliably blocked from light by preferably using an internal packaging material whose light transmittance is 57% or lower with respect to light having a wavelength of 910 nm or shorter in a state in which the planographic printing plates are internally packaged.

With regard to the light transmittance, if the total light transmittance of the internal packaging materials satisfies the above-mentioned value in a state in which the planographic printing plates are internally packaged in the internal packaging materials, there is no problem. For example, even though a single sheet of an internal packaging material might have a light transmittance of 57% or higher with respect to light having a wavelength of 910 nm or shorter, if the planographic printing plates are internally packaged in layers of the internal packaging materials with the resultant light transmittance in the state of internally packaging being 57% or lower, there is no problem. In other words, even though a single sheet of the internal packaging material might have a light transmittance of 57% or higher with respect to light having a wavelength of 910 nm or shorter, if each light transmittance is determined so that the resultant light transmittance is 57% or lower by using layers of the internal packaging materials, all of such internal packaging materials can be included in the "internal packaging material" referred to herein.

As long as the external packaging material can protect the planographic printing plates from an external force so as to prevent deformations or blemishes thereof by having a higher rigidity than the internal packaging material, the material forming the external packaging material is not particularly limited. For example, the external packaging material may be made of corrugated cardboard. The internally packaged planographic printing plates can thereby be reliably protected from an external force such that blemishes or deformations effecting the quality of the plates do not arise. In addition, the combination of the external packaging material and the internal packaging material is able to reliably ensure the necessary light-blocking and moisture-proofing properties such that the quality of the plates is not effected. As normal corrugated cardboard can be used as the external packaging material, the planographic printing plates can be packaged at a low cost.

A second aspect of the present invention is an internal packaging material for planographic printing plates for internally packaging the planographic printing plates, wherein a light transmittance of the internal packaging material is 57% or lower with respect to light having a wavelength of 910 nm or shorter.

Accordingly, the planographic printing plates can be reliably blocked from light by applying the internal packaging material to the above-described packaging structure of the planographic printing plates.

Also in the internal packaging material for the planographic printing plates according to the second aspect of the present invention, with regard to the light transmittance, if the total light transmittance of the internal packaging materials satisfies the above-mentioned value in a state in which the planographic printing plates are internally packaged in the internal packaging materials, there is no problem. For example, even though a single sheet of an internal packaging material might have a light transmittance of 57% or higher with respect to light having a wavelength of 910 nm or shorter, if the planographic printing plates are internally packaged in layers of the internal packaging materials with the resultant light transmittance in the state of internally packaging being 57% or lower, such internal packaging materials are included in the internal packaging material for the planographic printing plates according to the second aspect of the present invention. In other words, even though a single sheet of an internal packaging material might have a light transmittance of 57% or higher with respect to light having a wavelength of 910 nm or shorter, if each light transmittance is determined so that the resultant light transmittance is 57% or lower by using layers of the internal packaging materials, all of such internal packaging materials can be included in the "internal packaging material" referred to herein. In a case in which the planographic printing plates are internally packaged in a plural number of internal packaging materials, not only internal packaging materials each of which has the same light transmittance, but also internal packaging materials each of which has a different light transmittance may be used. The number of layers of the internal packaging materials is not particularly limited.

However, from the viewpoints of enabling an internal packaging with fewer sheets of material, of facilitating an internal packaging operation and an unpacking operation, and the like, it is preferable that about two to four sheets of internal packaging material are overlaid.

DESCRIPTION OF THE PREFERRED EMBODIMENTS

Figure 4:
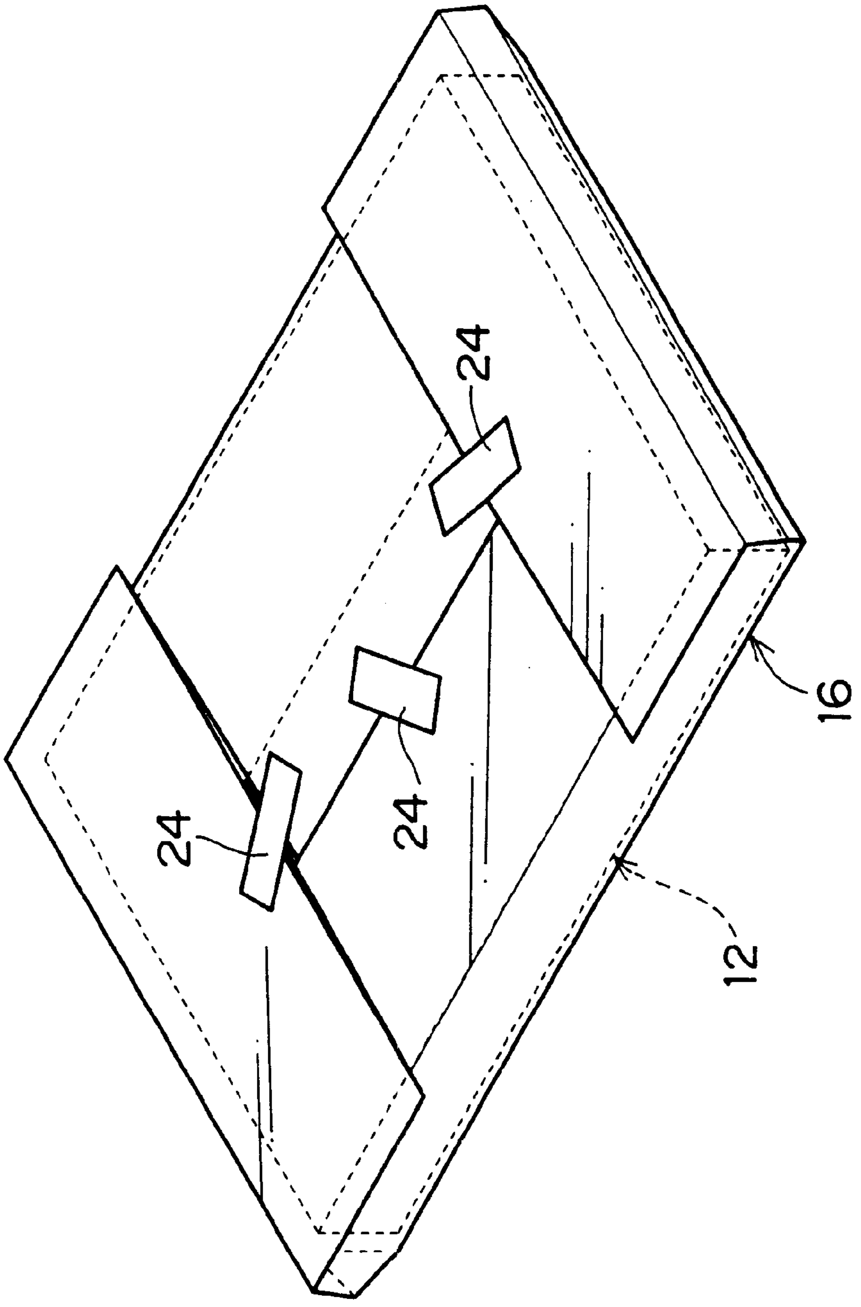
FIG. 4 is a perspective view which shows a state in which the planographic printing plates have been internally packaged in the packaging structure of the planographic printing plates according to the embodiment of the present invention.
Figure 5:
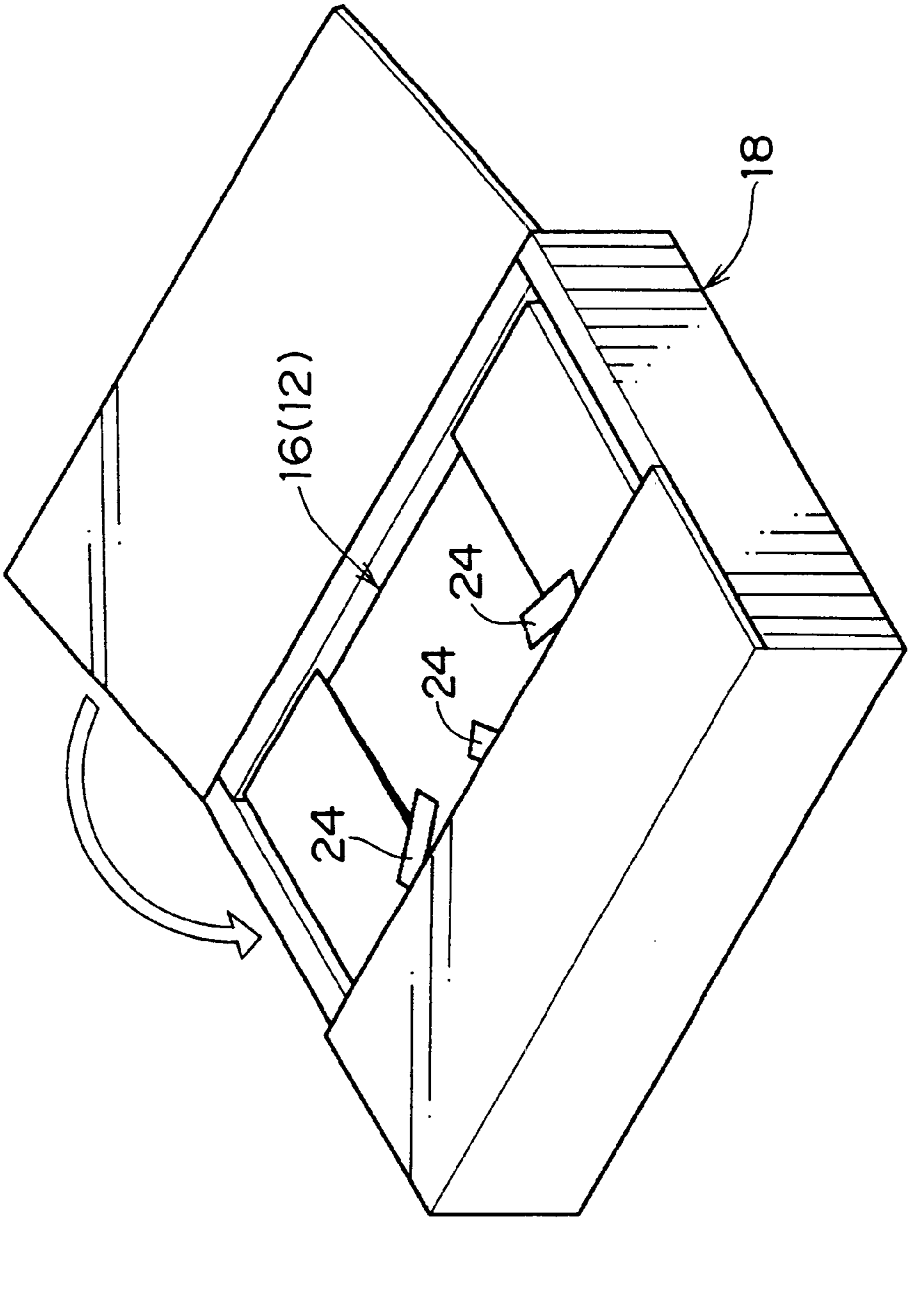
FIG. 5 is a perspective view which shows a step in a process of externally packaging the internally packaged planographic printing plates in the packaging structure of the planographic printing plates according to the embodiment of the present invention.
Figure 6:
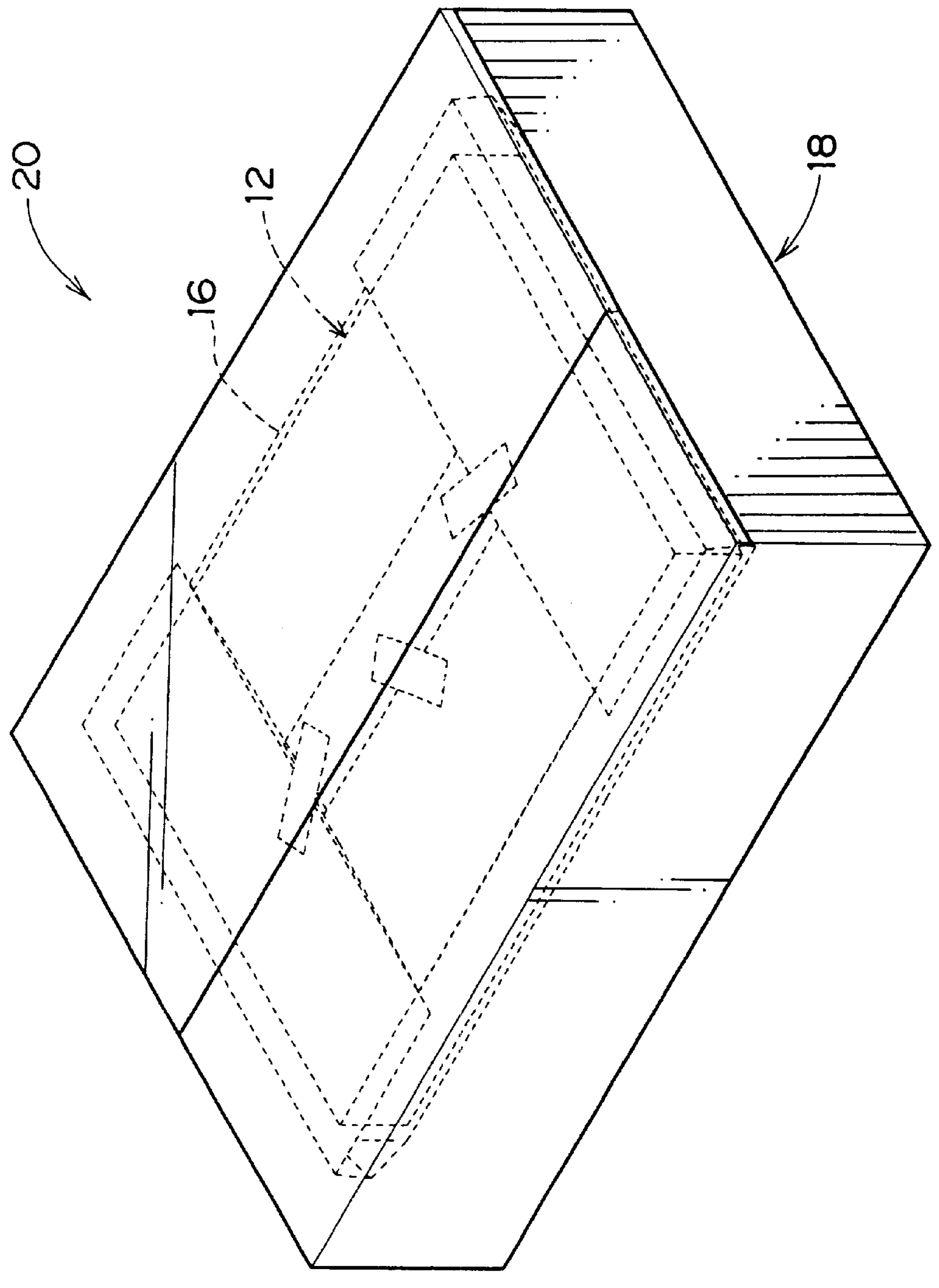
FIG. 6 is a perspective view which shows a state in which the internally packaged planographic printing plates have been externally packaged in the packaging structure of the planographic printing plates according to the embodiment of the present invention.

In FIGS. 1–4, a process of packaging a stack 12 of planographic printing plates 10 in an internal packaging paper 16 according to an embodiment of the present invention is shown. In FIGS. 5 and 6, a process of further externally packaging the stack 12, which has been internally packaged in the internal packaging paper 16, in an external packaging material 18 also according to the embodiment of the present invention is shown. A packaging structure 20 of the planographic printing plates of the present invention (hereinafter, simply referred to as "packaging structure") is structured of the internal packaging paper 16 and the external packaging material 18.

Figure 1:
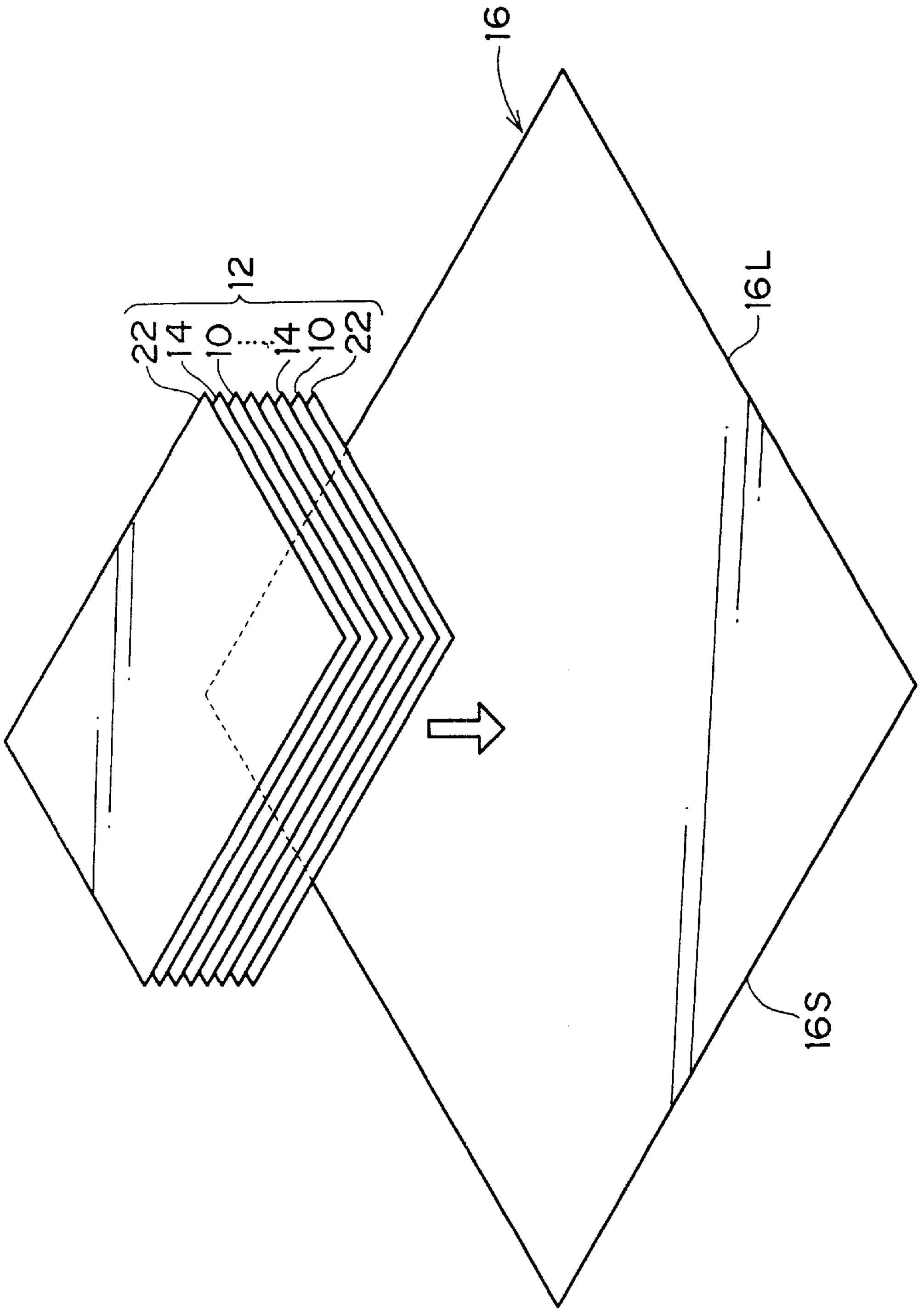
FIG. 1 is a perspective view which shows a step in a process of internally packaging planographic printing plates in a packaging structure of the planographic printing plates according to an embodiment of the present invention.

The planographic printing plate 10 is formed by applying a photosensitive layer (in a case of a thermosensitive printing plate, a thermosensitive layer) on a thin aluminum support which is formed in a rectangular plate. As can be seen in FIG. 1, the stack 12 of the planographic printing plates 10 is structured by alternately stacking, in the thickness direction, the planographic printing plate 10 and an interleaf 14 which protects the photosensitive layer, and by further disposing a protective cardboard 22 on the uppermost surface and the lowermost surface of the stack. The number of the planographic printing plates 10 structuring a stack 12 is not particularly limited.

However, from the viewpoint of the efficiency of transportation and storage, and the like, the number may be 10 to 100. When the stack 12 is structured by 10 to 100 sheets of the planographic printing plates 10 in this manner, it is preferable that the planographic printing plates 10 and the protective cardboards 22 are fastened to each other by a fastening means such as an adhesive tape 24 so as not to be disordered. Further, it is also possible that the stack 12 is structured by a larger number of planographic printing plates 10 so as to transport and store the plates more efficiently (handling can be carried out fewer times). For example, the number of the planographic printing plates 10 may be around 1,500 at the maximum, and the protective cardboard 22 may be disposed on every 20 to 100 sheets of the planographic printing plates 10. Further, the number of the planographic printing plates 10 may be around 1,500 at the maximum, and the protective cardboard 22 may be disposed only on the uppermost surface and the lowermost surface of the stack. Additionally, depending upon the type of the planographic printing plates 10, the interleaves 14 and/or the protective cardboards 22 may be omitted.

The internal packaging paper 16 is formed by a sheet of rectangular unbleached kraft paper having a predetermined size. As the unbleached kraft paper, a paper whose light transmittance is 57% or lower is used.

Figure 2:
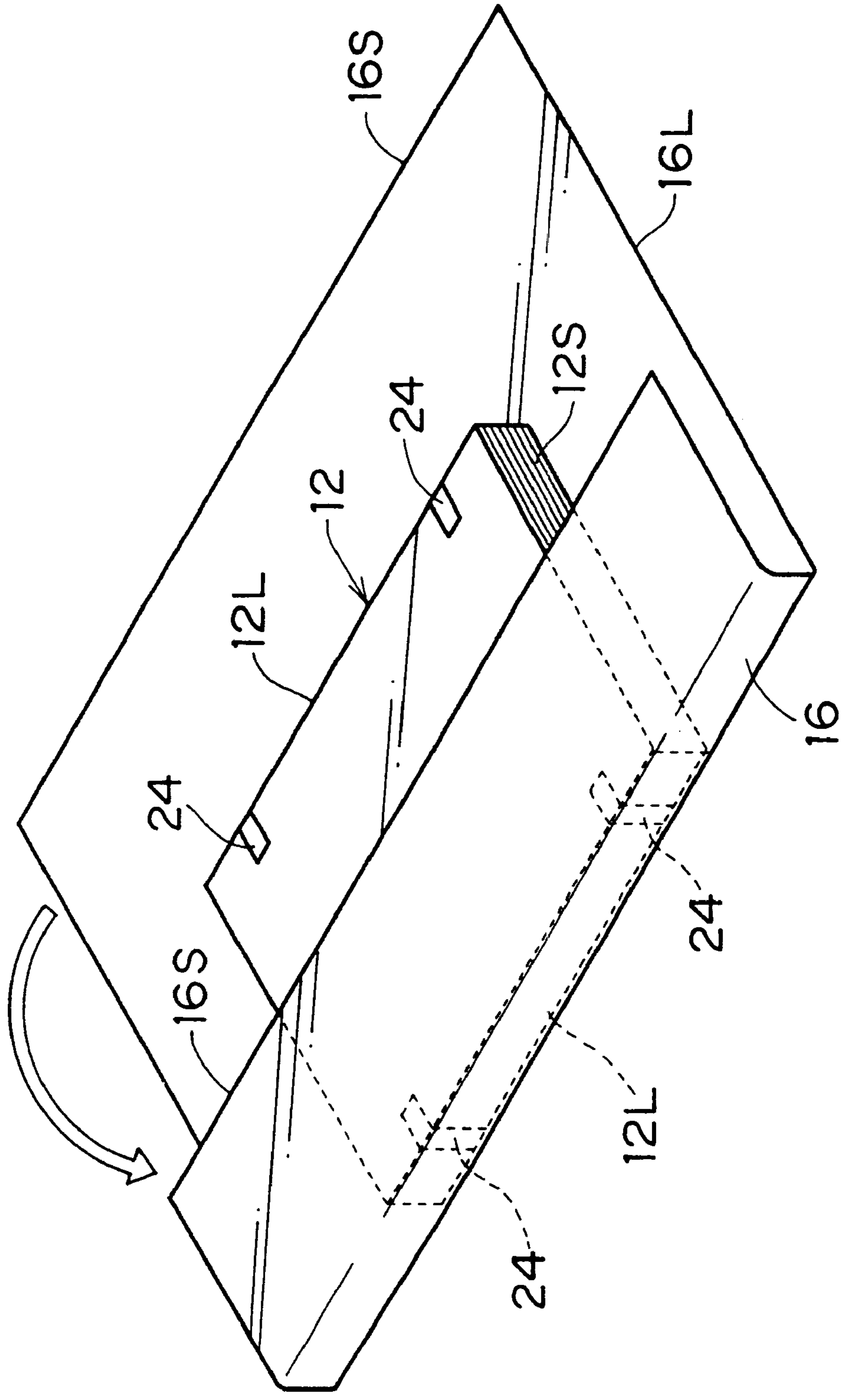
FIG. 2 is a perspective view which shows a step in the process of internally packaging the planographic printing plates in the packaging structure of the planographic printing plates according to the embodiment of the present invention.
Figure 3:
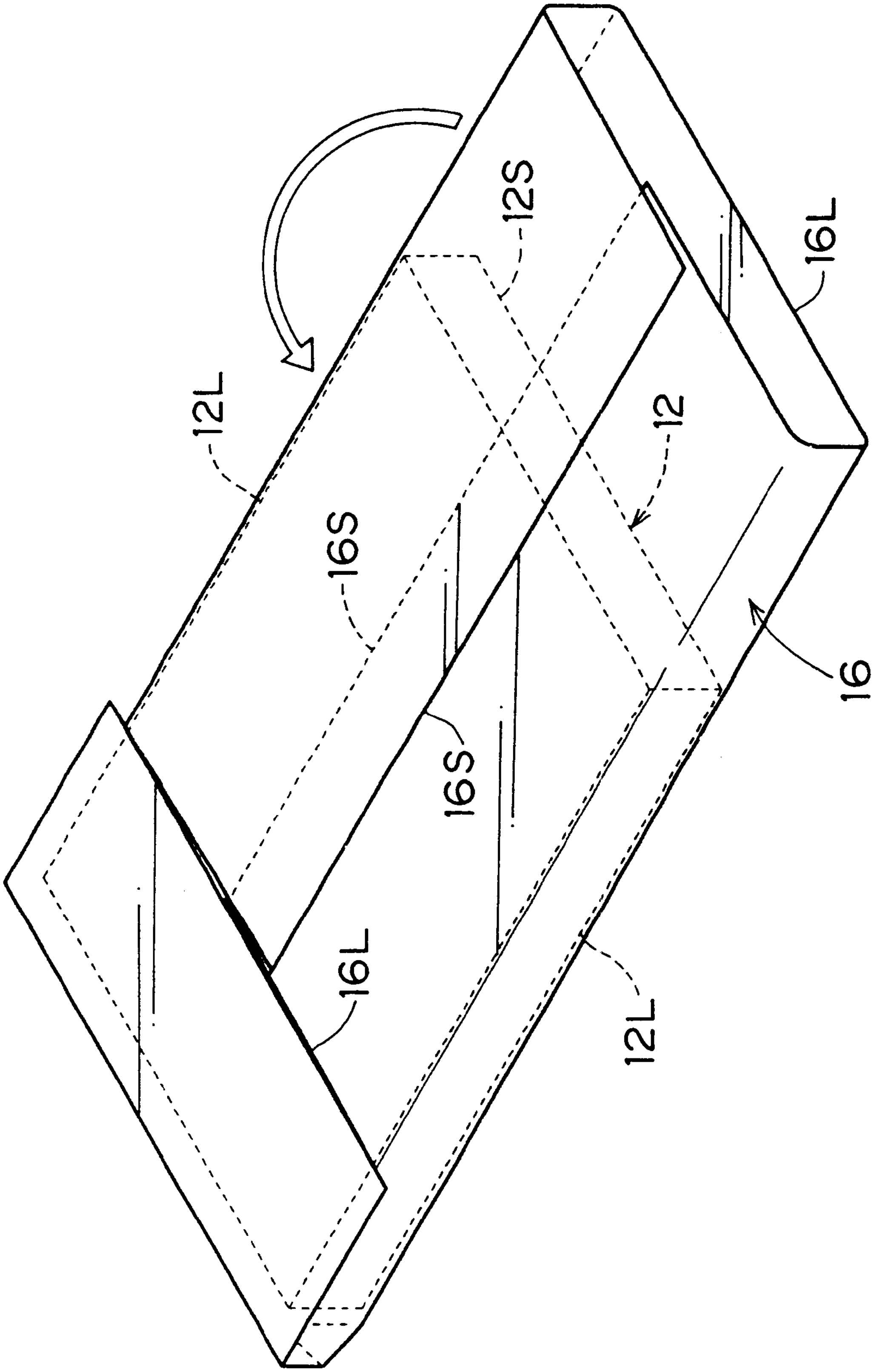
FIG. 3 is a perspective view which shows a step in the process of internally packaging the planographic printing plates in the packaging structure of the planographic printing plates according to the embodiment of the present invention.

Long edges 16L of the internal packaging paper 16 have a predetermined length which is capable of the following process. As shown in FIG. 2, the stack 12 is placed onto the substantial center of the internal packaging paper 16 so that long edges 12L of the stack 12 are parallel to short edges 16S of the internal packaging paper 16. Then, both short edges 16S of the internal packaging paper 16 are folded along the long edges 12L of the stack 12 so that the vicinities of the short edges 16S of the internal packaging paper 16 partially overlap each other (see FIG. 3).

Further, the short edges 16S of the internal packaging paper 16 have a predetermined length which is capable of the following process. In the state in which the vicinities of the short edges 16S partially overlap each other, the long edge 16L sides of the internal packaging paper 16 are further folded so that the long edges 16L partially overlap a top surface of the stack 12 when seen in a plan view (see FIG. 3). In this way, the stack 12 is internally packaged in the internal packaging paper 16. As a result, the stack 12 is entirely enveloped in the internal packaging paper 16 as shown in FIG. 4. Finally, the internal packaging paper 16 is taped at predetermined positions by the adhesive tapes 24, and thereby fastened so as not to spread or slip off inadvertently.

It is evident that the structure shown in FIG. 4 is an example of a structure for internally packaging the stack 12 in the internal packaging paper 16, and that the present invention is not limited to this structure. In other words, as long as the planographic printing plates 10 can be reliably blocked from light and kept free from moisture by enveloping the stack 12 in the internal packaging paper 16 in combination with the external packaging material 18 (which will be described later), other structures may be used.

A shown in FIGS. 5 and 6, the external packaging material 18 is structured by corrugated cardboard, and is formed by a corrugated cardboard box having internal dimensions which can contain one or a plural number of internally packaged stacks 12. Therefore, in a state in which the internally packaged stack 12 is contained inside of the corrugated cardboard box, the corrugated cardboard is positioned around the periphery of the internally packaged stack 12, and thus, even if something hits the corrugated cardboard from the exterior during transportation or storage, the energy is absorbed by the corrugated cardboard. Further, light from the exterior of the corrugated cardboard box is blocked by the corrugated cardboard, with the result that light reaching the internal packaging paper 16 becomes extremely faint (substantially, only light entering from the fastened portion of the corrugated cardboard and the like reaches the internal packaging paper 16). Furthermore, the corrugated cardboard box acts as a buffer against changes in humidity and temperature occurring outside of the corrugated cardboard box, and thus, changes in humidity and temperature in the interior of the corrugated cardboard box are smaller than those outside.

It is preferable that the top of the corrugated cardboard box is fastened by an unillustrated fastening means (such as an adhesive tape, a tack or a band) so as not to open inadvertently.

FIGS. 5 and 6 show a case in which only one stack 12 is contained. However, when a plurality of stacks 12 are contained, the external packaging material (corrugated cardboard box) 18 may be structured so that the plurality of stacks 12 can be placed side by side in any directions of length, width and height of the external packaging material 18. Further, in the internal dimensions of the corrugated cardboard box, even if a gap between the corrugated cardboard box and the stack 12 is about 100 mm, there is no problem in practice. However, it is more preferable that the internal length, width and height of the corrugated cardboard box is substantially conformed to those of the internally packaged stack 12 to be contained (in the case in which a plurality of stacks 12 are contained, conformed to those of the entire stacks 12), because inadvertent movement or disorder of the stack 12 inside the corrugated cardboard box is prevented.

A type of the corrugated cardboard box is not particularly limited, and any of slotted type boxes (Code Nos. 0200–0216), telescope type boxes (Code Nos. 0300–0325), folder type boxes (Code Nos. 0401–0435), slide type boxes (Code Nos. 0501–0511), Bliss type boxes (Code Nos. 0601–0608) and ready glued type boxes (Code Nos. 0712–0771), which are defined in JIS Z1507, may be used. However, because a top surface of the corrugated cardboard box is open in the types of Code Nos. 0200, 0422–0435, 0501–0503 and 0771, from the viewpoints of protecting the contained stack 12 from an external force and of blocking the stack 12 from light and keeping the stack 12 free from moisture, types other than these, i.e., types which can entirely envelop the stack 12 are preferable.

Figure 7:
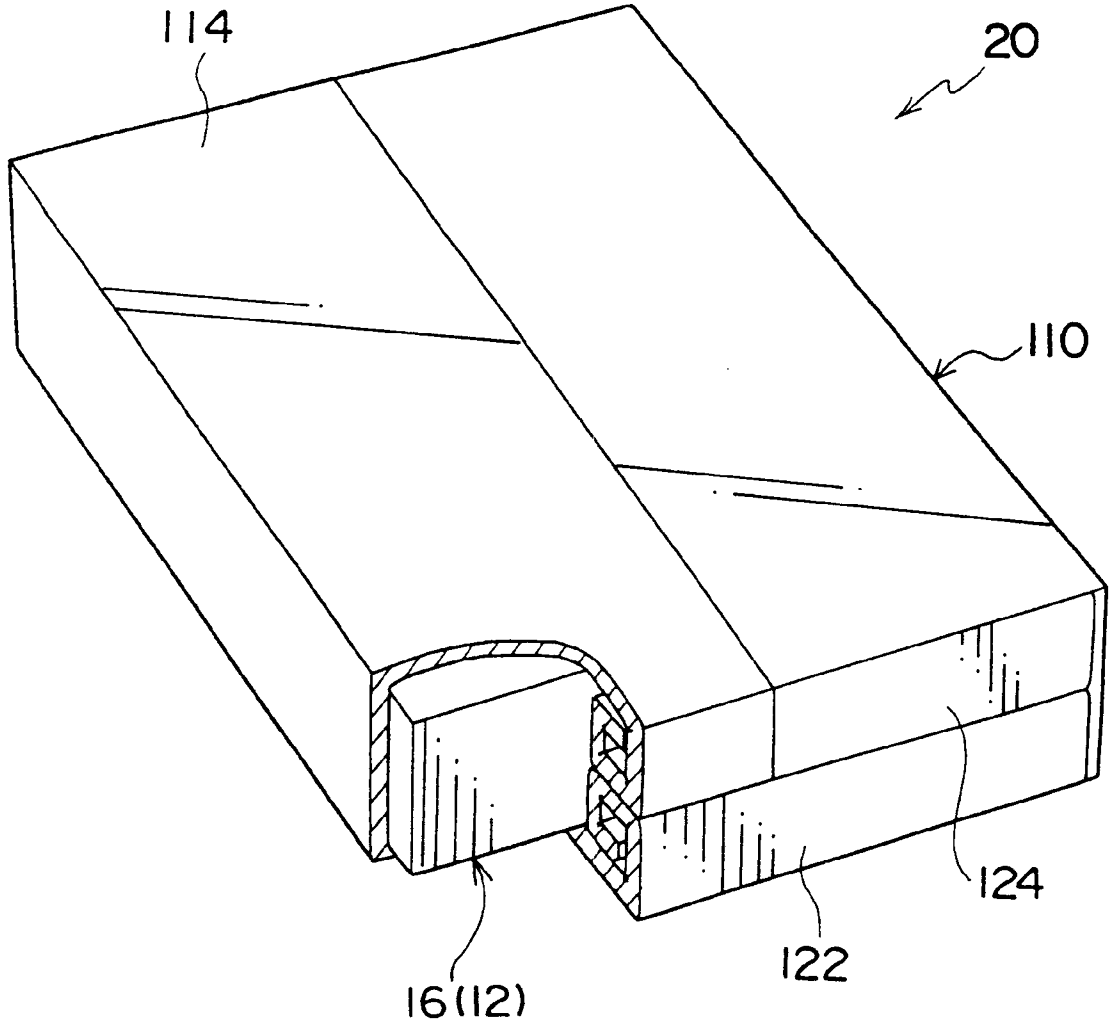
FIG. 7 is a perspective view which shows a state in which the internally packaged planographic printing plates have been externally packaged in an external packaging material that is different from the external packaging material shown in FIG. 6, in the packaging structure of the planographic printing plates according to the embodiment of the present invention.

Further, a corrugated cardboard box 110, which has a structure shown in FIG. 7, can be also used.

Figure 8:
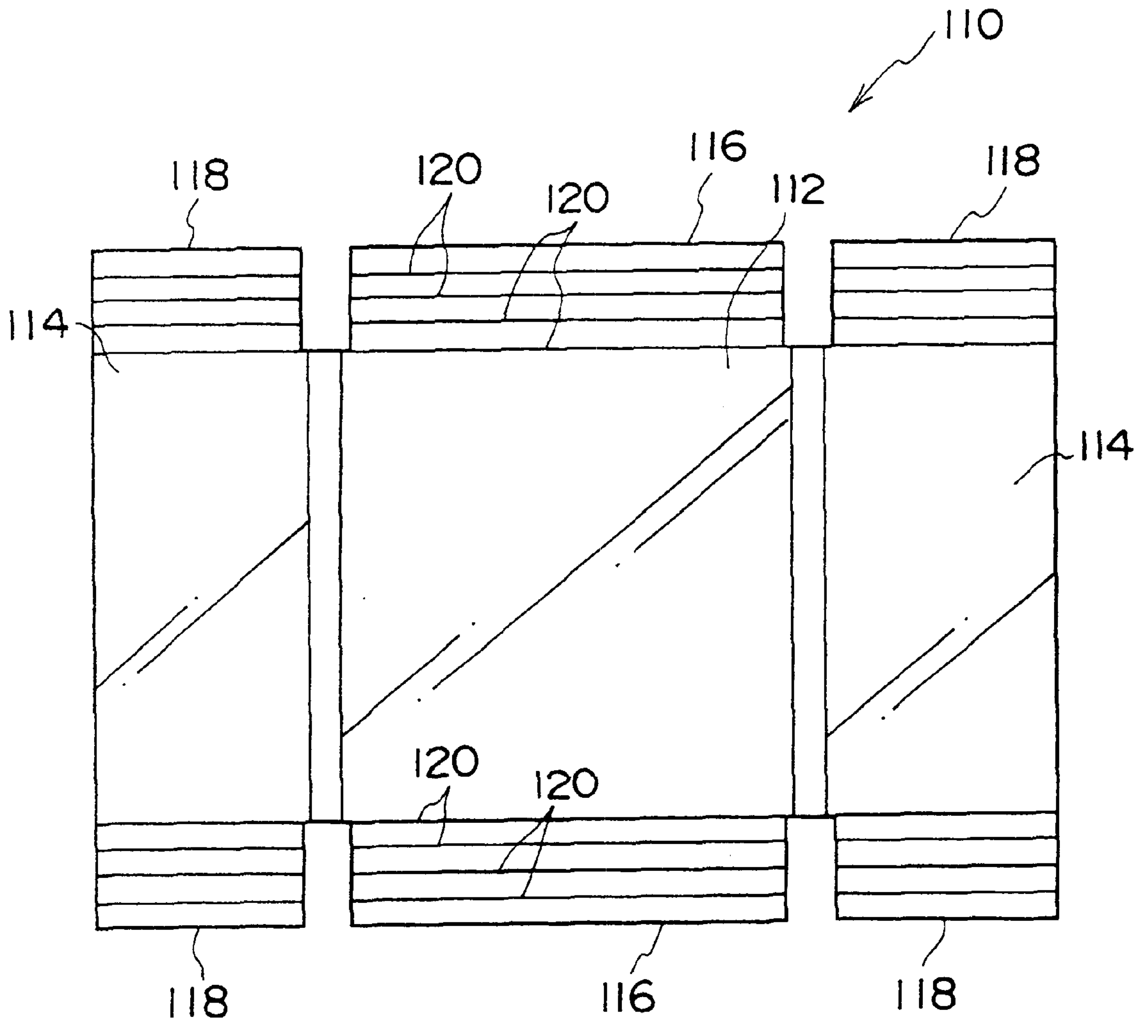
FIG. 8 is a developed view of the external packaging material shown in FIG. 7.

In this corrugated cardboard box 110, as can be seen in a developed view shown in FIG. 8, bottom surface laminated panels 116 and top surface laminated panels 118 are provided adjacent to short edge sides of a bottom surface panel 112 and of top surface panels 114, respectively. A plurality of fold lines 120 are formed at the bottom surface laminated panels 116 and the top surface laminated panels 118, and spiral laminated portions 122 and 124 as shown in FIG. 7 are formed by folding the panels along the fold lines 120. Accordingly, even if a large force is applied to the corrugated cardboard box 110 from the exterior, the planographic printing plates 10 structuring the stack 12 are reliably protected such that at least blemishes or deformations which might result in problems of quality are prevented.

Next, an operation of the packaging structure 20 of the present embodiment will be described.

As shown in FIG. 6, the corrugated cardboard of the corrugated cardboard box, which serves as the external packaging material 18, is positioned around the periphery of the stack 12 (planographic printing plates 10), which is internally packaged in the internal packaging paper 16. Therefore, even if something hits the corrugated cardboard from the exterior during transportation or storage, the energy is absorbed by the corrugated cardboard. External force is not applied to the planographic printing plates 10, or if applied, the external force is buffered (the energy is absorbed) such that deformations or blemishes are substantially prevented, and thus, corners, edges, interiors or any other portions of the planographic printing plates 10 are prevented from being deformed or blemished. As a result, even if the planographic printing plates 10, which have been packaged in the packaging structure 20, are used after transportation or storage, such problems that images are unclear when the plates have been developed after light-exposure or the plates have been developed with heat, or that ink is not uniform when the images have been printed, are not caused, and clear images can be always obtained.

In the interior of the external packaging material 18, light from the exterior of the external packaging material (corrugated cardboard box) 18 is blocked by the corrugated cardboard. Therefore, in the state in which the stack is completely externally packaged in the corrugated cardboard box (in the state in which the top of the corrugated cardboard box is closed), the planographic printing plates are blocked from light to some extent, with the result that light reaching the internal packaging paper 16 becomes extremely faint (for example, light filtering in through gaps in the corrugated cardboard box which reaches the internal packaging paper 16). The internal packaging paper 16 is formed by an unbleached kraft paper whose light transmittance is 57% or lower, and the internal packaging paper 16 entirely envelops the stack 12) and thus, faint light reaching the internal packaging paper 16 does not reach the planographic printing plates 10 inside thereof. As a result, the photosensitive or thermosensitive layers of the planographic printing plates 10 are not exposed to light and thereby not deteriorated, a change in sensitivity is not caused, and thus, constant quality of the planographic printing plates 10 is maintained.

Further, even if rapid changes in humidity and temperature occur outside of the external packaging material 18, the external packaging material (corrugated cardboard box) 18 acts as a buffer against the changes in humidity and temperature, and thus, changes in humidity and temperature in the interior of the external packaging material 18 are smaller than those outside. Accordingly, drawbacks such as dewing being caused in the photosensitive or thermosensitive layers of the planographic printing plates 10 and deteriorating the layers are prevented, and thus, constant quality of the planographic printing plates 10 is maintained. Additionally, the interleaves 14 do not inadvertently adhere to any of the planographic printing plates 10 other than the planographic printing plates 10 which the interleaves 14 protect the photosensitive or thermosensitive layers thereof, and thus, handling of the planographic printing plates 10 is not disturbed.

In the present embodiment, an unbleached paper is used as the internal packaging paper 16, and the planographic printing plates are blocked from light and kept free from moisture by using this unbleached paper in combination with the external packaging material (corrugated cardboard box) 18. When a so-called aluminum kraft paper is used, as has conventionally been the case, the paper cannot be recycled when the paper is disposed and it becomes necessary to dispose of the paper by dumping it as industrial waste, or by incineration or the like. However, in the present embodiment, the internal packaging paper 16 can be recycled as a recyclable material, and disposal such as dumping or incineration becomes unnecessary. Thus, the internal packaging paper 16 can be easily disposed of.

In the above description, although an external packaging material structured of a corrugated cardboard box has been described as an example of the external packaging material 18, a specific example of the external packaging material 18 is not limited to the corrugated cardboard. In other words, as long as the planographic printing plates 10 are blocked from light and kept free from moisture by externally packaging the stack 12 of the planographic printing plates 10 which has been internally packaged in the internal packaging paper 16, by combining the external packaging material 18 with the internal packaging paper 16, and as long as the external packaging material 18 has sufficient rigidity and strength to reliably protect the planographic printing plates 10 from an external force, other materials may be used as the external packaging material 18. Preferably, the external packaging material 18 has a higher rigidity than at least the internal packaging paper 16. For example, boxes formed by cardboard which satisfies these conditions, or boxes formed by a honeycomb structure material may be used. Further, the external packaging material 18 may be normal wood, resin, metal, cardboard or the like.

When the corrugated cardboard box is used as the external packaging material 18, from the viewpoints of strength and rigidity, the following structure is preferable.

First, the most preferable type of corrugation (flute) for the corrugated cardboard is an A flute, followed by a C flute, a B flute and an E flute in that order. The most preferable type of layer structure for the corrugated cardboard is triple wall corrugated cardboard (such as AAA), followed by double wall corrugated cardboard (such as AA) and single wall corrugated cardboard (such as A).

The most preferable type of liner for front and rear liners of the corrugated cardboard is an AA liner, followed by an A liner, a B liner and a C liner. The basis weight of the front and rear liners is in a range of 160 to 440 g/m$^2$. The most preferable type of corrugating medium for the corrugated cardboard is reinforced corrugating medium, followed by an A corrugating medium, a B corrugating medium and a C corrugating medium. The basis weight of the corrugating medium is in a range of 100 to 280 g/m$^2$.

When the paper-made honeycomb structure material is used in place of the corrugated cardboard, the same front liner, rear liner and corrugating medium as those of the above-described corrugated cardboard are preferably used.

Further, when the cardboard is used in place of the corrugated cardboard, the basis weight thereof is preferably in a range of 200 to 2,000 g/m$^2$.

In general, the stronger the corrugated cardboard or paper-made honeycomb structure material is, the more expensive the material becomes. Therefore, in order to obtain the necessary strength and keep costs relatively low, the following are more preferable. It is more preferable that an A or an AB flute is used as the corrugation; that the structure is an A or an AB type; that A or B liners having a basis weight of about 280–180 g/m$^2$ are used as the front and rear liners; and that a reinforced, B or C corrugating medium having a basis weight of about 220–120 g/m$^2$ is used as the corrugating medium.

Similarly, the internal packaging paper 16 is not limited to the above-mentioned unbleached kraft paper. As long as the planographic printing plates 10 can be reliably blocked from light and kept free from moisture in combination with the external packaging material 18, such that the quality of the planographic printing plates 10 is not effected, other types of paper may be used. Specifically, colored simili paper, colored drawing paper, various types of coated paper, colored kraft paper or the like, which have a light transmittance of a predetermined value or lower, may be used.

It is unnecessary that the light transmittance condition be satisfied with a single sheet of internal packaging paper 16. In other words, even though the light transmittance of a single sheet might be higher than the predetermined value, if the planographic printing plates 10 are internally enveloped in a plural number of internal packaging papers 16, the total light transmittance of the internal packaging papers 16 is substantially the predetermined value or lower. Thus, transmittance of light can be prevented and deterioration of the photosensitive or thermosensitive layers can be prevented. In a case in which a plural number of internal packaging papers 16 are used, the number of layers of the internal packaging papers 16 is not particularly limited. However, from the viewpoints of enabling an internal packaging with fewer sheets of internal packaging paper 16, of facilitating an internal packaging operation and an unpacking operation, and the like, it is preferable that about two to four sheets of internal packaging paper 16 are overlaid.

EXAMPLES

Hereinafter, although the present invention will be described in detail by providing examples, the present invention is not limited to the following examples.

In the present example, a coiled aluminum web (thickness: 0.3 mm; width: 1,310 mm) was set in a planographic printing plate manufacturing machine and transmitted, and the surface thereof was mechanically or chemically processed to provide a hydrophilic property. Thereafter, a photosensitive layer (or a thermosensitive layer) was applied on the surface and dried, and then, a matting agent was further applied thereon in order to improve a vacuum-suction property during use. Then, an optical detection of defects was conducted, mark labels showing defective positions were attached to the defective portions of the web at one end side of the transverse direction thereof, and the web was coiled again.

The applied coil manufactured in this way was temporarily stored on a coil rack. Thereafter, the coil was set in a finishing machine and transmitted so that the applied surface was on top, and the curl was substantially smoothed by a decurler so as to obtain flatness. Then, an interleaf 14 which had been separately transmitted was overlaid on the applied surface (the photosensitive or thermosensitive layer), and the applied web and the interleaf 14 were adhered to each other by applying high voltage. As the interleaf 14, a paper having a basis weight of 30 g/m$^2$, a density of 0.8 g/cm$^3$, a moisture of 4.5%, a Beck's smoothness of about 500 seconds and a PH of 5.5, which paper was made from a raw material of broadleaf tree type of 100% bleached kraft pulp, was used.

Sequentially, both ear portions (both end portions of the transverse direction) of the web were equally slit (cut) by a slitter so as to have a predetermined width (1,300 mm in the present example), and thereafter, the web was cut by an automatic cutter, which moved at the same speed as the web, so as to have a predetermined length (1,050 mm in the present example). As a result, sheets of planographic printing plate 10 having a desired size (thickness: 0.3 mm; width: 1,300 mm; length: 1,050 mm) were obtained.

Further, the planographic printing plates 10 were conveyed by a conveyer, information regarding positions of the mark labels which had been attached during manufacture was read so as to measure the length, and planographic printing plates 10 having defects thereon were removed with a switching gate. In this way, only non-defective planographic printing plates 10 were continuously conveyed by the conveyer, and a predetermined number of sheets (50 sheets in the present example) were collected sequentially in the thickness direction at a collecting portion. Finally, a sheet of protective cardboard 22 was disposed on each end surface of the overlaid direction of the collected planographic printing plates 10 so as to form a loaded stack 12. As the protective cardboard 22, a paper having a basis weight of 610 $g/m^2$, a density of 0.75 $g/cm^3$, a moisture of 6.5%, a Beck's smoothness of 8 seconds and a PH of 5.5, which paper was made from a recycled material, was used. As shown in FIG. 2, the protective cardboards 22 were fastened to the laminated planographic printing plates 10 and interleaves 14 by adhesive tapes 24 at two points of each opposite edge.

Figure 9:
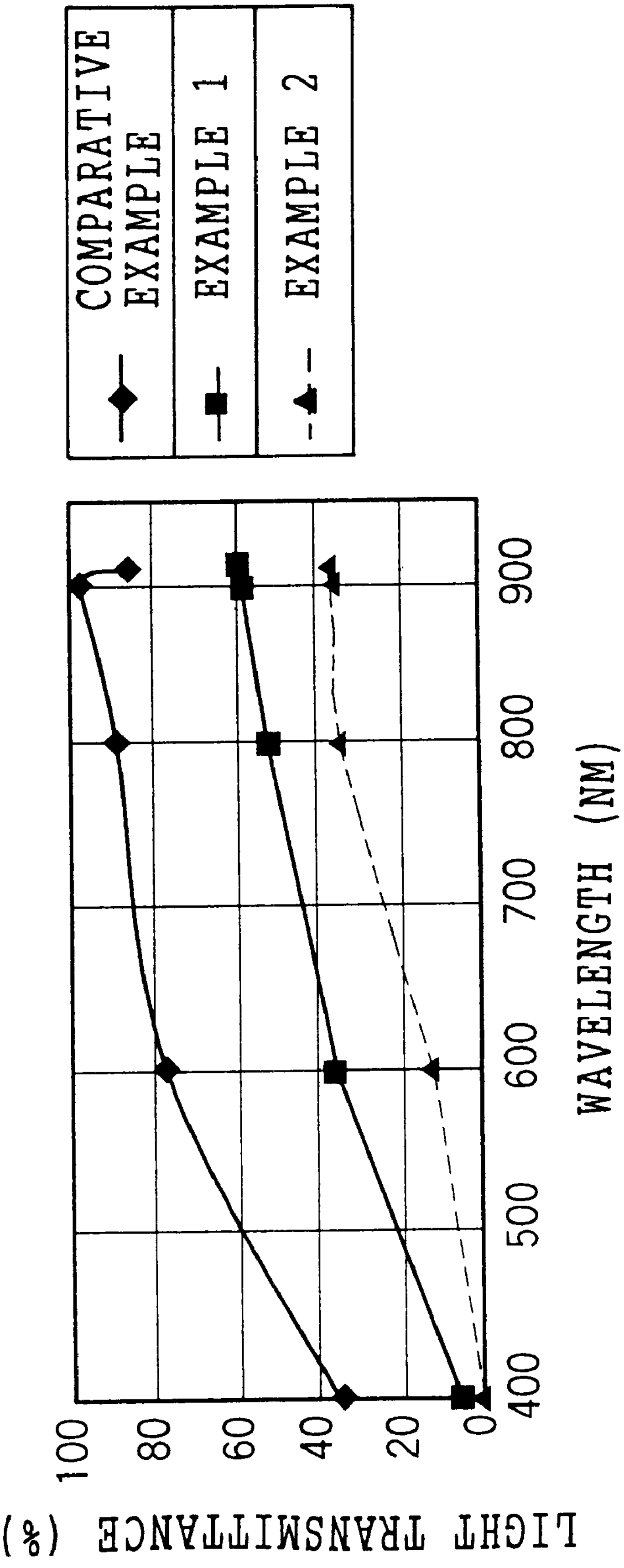
FIG. 9 is a graph which shows a relationship between the wavelength and the light transmittance of the internal packaging papers relating to Examples and Comparative Example of the present invention.
Figure 10:
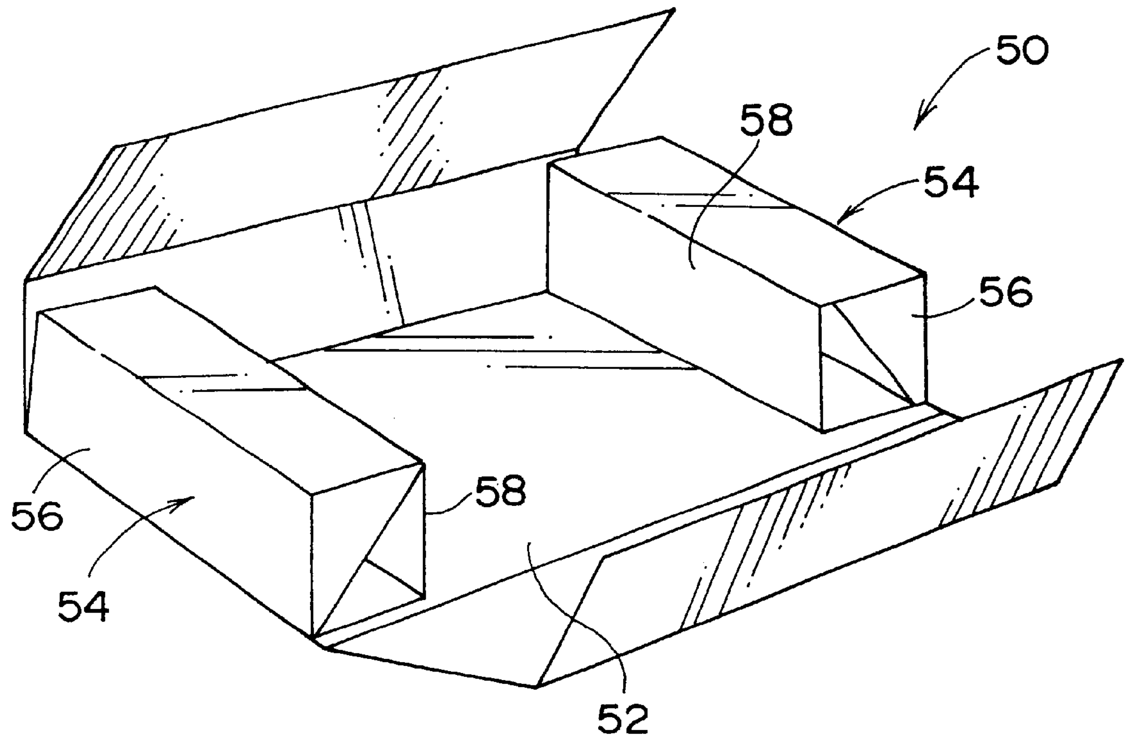
PRIOR ART FIG. 10
FIG. 10 is a perspective view which shows a conventional corrugated cardboard box.

FIG. 9 were obtained (the measurement was impossible at 920 nm). As can be seen from the table and the graph, in Example 1, the light transmittance was 57% at a wavelength of 910 nm, and the light transmittance was lower than 57% at a wavelength which was shorter than 910 nm. Also in Example 2, the light transmittance was 35% at a wavelength of 910 nm, and the light transmittance was lower than 35% at a wavelength which was shorter than 910 nm. On the other hand, in Comparative Example, the light transmittance was higher than 57% at an entire wavelength range of about 500 to 910 nm.

The stack 12, which had been internally packaged in this manner, was externally packaged in a corrugated cardboard box 110 shown in FIG. 7. As the corrugated cardboard forming the corrugated cardboard box 110, a cardboard which had an A flute, a layer structure of a single wall, A or B front and rear liners (basis weight: 220 $g/cm^3$) and a C corrugating medium (basis weight: 180 $g/cm^3$) was used.

Then, top surface panels 114, and laminated panels 122 and 124 of the corrugated cardboard box 110 were respectively adhered to each other by a hot melt or polyvinyl acetate adhesive and by a kraft adhesive tape so as to form a packaging structure 20 of the present example.

These packaging structures according to Examples 1 and 2 and Comparative Example were left at a distribution-warehouse for four months, respectively. Thereafter, the planographic printing plates were subjected to a development processing, and it was evaluated whether so-called "accidental exposure" (light fog) was caused or not.

TABLE 1

| Wavelength (nm) | Light Transmittance of Each Wavelength (%) | | | | | | |
|---|---|---|---|---|---|---|---|
| | 400 | 600 | 800 | 900 | 910 | 920 | Light fog |
| Comparative Example | 36 | 76 | 87 | 94 | 83 | impossible of measurement | caused |
| Example 1 | 6 | 34 | 50 | 55 | 57 | impossible of measurement | not caused |
| Example 2 | 1 | 11 | 33 | 34 | 35 | impossible of measurement | not caused |

As an internal packaging paper 16, an unbleached third type SS-50 kraft paper (density: 0.55–0.75 $g/cm^3$; moisture: 3–7%, Beck's smoothness: 4–20 seconds; PH: 4–8) which is defined in JIS P 3401 was used as Example 1, and an unbleached first type MS-75 kraft paper (density: 0.55–0.75 $g/cm^3$; moisture: 3–7%, Beck's smoothness: 4–20 seconds; PH: 4–8) which is also defined in JIS P 3401 was used as Example 2. As shown in FIG. 4, the stack 12 was entirely internally enveloped by using these internal packaging papers 16.

Further, an unbleached kraft paper, which has a higher light transmittance than the above unbleached kraft papers of Examples 1 and 2, and which is not defined in JIS, was used as Comparative Example. As shown in FIG. 4, the stack 12 was entirely internally enveloped by using this internal packaging paper 16.

When light transmittances of these unbleached kraft papers of Examples 1 and 2 and Comparative Example were measured at a wavelength range of 400 to 910 nm by a spectrophotometer (model 20A), which is manufactured by Hitachi, Ltd., values shown in the following Table 1 and As can be seen from the above Table 1, when the internal packaging paper 16, whose light transmittance was 57% or lower with respect to light having a wavelength of 910 nm or shorter, was used (Examples 1 and 2), accidental exposure was not caused. On the other hand, when the unbleached kraft paper, whose light transmittance was higher than 57% with respect to light having a wavelength of 910 nm, was used as the internal packaging paper (Comparative Example), accidental exposure was caused. Therefore, it is preferable that the paper whose light transmittance is 57% or lower with respect to light having a wavelength of 910 nm or shorter is used as the internal packaging paper 16.

In particular, photosensitive printing plates generally have sensitivity with respect to light in a wavelength range of 550 nm or shorter. Taking this into consideration, as can be seen from the graph in FIG. 9, in both Examples 1 and 2, the light transmittances were 30% or lower in this wavelength range. On the other hand, in Comparative Example, the light transmittance was higher than 30% in this wavelength range. As a result, it was found that the internal packaging papers 16 in Examples 1 and 2 of the present invention can reliably prevent accidental exposure of the photosensitive printing plates.

Thermosensitive printing plates generally have sensitivity with respect to light in a wavelength range of around 700 to 900 nm. Taking this into consideration, as can be seen also from the graph in FIG. 9, in both Examples 1 and 2, the light transmittances were 57% or lower in this wavelength range. On the other hand, in Comparative Example, the light transmittance was higher than 80% in this wavelength range. As a result, it was found that the internal packaging papers 16 in Examples 1 and 2 of the present invention can also reliably prevent accidental exposure of the thermosensitive printing plates.

What is claimed is:

1. A packaging structure of planographic printing plates, said structure comprising:

an internal packaging material, which internally packages the planographic printing plates, wherein said internal packaging material has a light transmittance from greater than 0% up to and including 57%, is a general paper which can be recycled, and further wherein at least two portions of said internal packaging material are adhered to one another so as to enclose said planographic printing plates; and an external packaging material, which externally packages the planographic printing plates that have been internally packaged in said internal packaging material, and which has a higher rigidity than said internal packaging material.

2. A packaging structure of planographic printing plates according to claim 1, wherein, in a state in which the planographic printing plates have been internally packaged in said internal packaging material, a light transmittance of said internal packaging material is 57% or lower with respect to light having a wavelength of 910 nm or shorter.

3. A packaging structure of planographic printing plates according to claim 2, wherein said external packaging material is made of corrugated cardboard.

4. A packaging structure of planographic printing plates according to claim 1, wherein said external packaging material is made of corrugated cardboard.

5. A packaging structure of planographic printing plates according to claim 1, wherein said external packaging material acts as a buffer against changes in temperature and humidity occurring outside of the external packaging material.

6. A packaging structure of planographic printing plates, said structure comprising:

an internal packaging material, which internally packages the planographic printing plates, wherein, in a state in which the planographic printing plates have been internally packaged in said internal packaging material, said internal packaging material having a light transmittance from greater than 0% up to and including 57% with respect to light having a wavelength of 910 nm or shorter; and an external packaging material, which externally packages the planographic printing plates that have been internally packaged in said internal packaging material, and which has a higher rigidity than said internal packaging material.

7. A packaging structure of planographic printing plates according to claim 6, wherein said external packaging material acts as a buffer against changes in temperature and humidity occurring outside of the external packaging material.

8. A packaging structure of planographic printing plates according to claim 6, wherein said external packaging material is made of corrugated cardboard.

9. An internal packaging material for planographic printing plates for internally packaging the planographic printing plates, wherein said internal packaging material has a light transmittance from greater than 0% up to and including 57% with respect to light having a wavelength of 910 nm or shorter, and further wherein at least two portions of said internal packaging material are adhered to one another so as to enclose said planographic printing plates.

10. An internal packaging material for planographic printing plates according to claim 9, wherein said internal packaging material is a general paper which can be recycled.

11. A packaging structure of planographic printing plates, said structure comprising:

an internal packaging material, which internally packages the planographic printing plates, wherein said internal packaging material has a light transmittance from greater than 0% up to and including 57%, is a general paper which can be recycled, and further wherein at least two portions of said internal packaging material are adhered to one another so as to enclose said planographic printing plates; and an external packaging material, which externally packages the planographic printing plates that have been internally packaged in said internal packaging material, and which is made of a material that acts as a buffer against changes in temperature and humidity occurring outside of the external packaging material in order to further protect the internally packaged planographic printing plates.

12. A packaging structure of planographic printing plates according to claim 11, wherein, in a state in which the planographic printing plates have been internally packaged in said internal packaging material, a light transmittance of said internal packaging material is 57% or lower with respect to light having a wavelength of 910 nm or shorter.

13. A packaging structure of planographic printing plates according to claim 11, wherein said external packaging material is made of corrugated cardboard.

14. A packaging structure of planographic printing plates, said structure comprising:

an internal packaging material, which internally packages the planographic printing plates, wherein, in a state in which the planographic printing plates have been internally packaged in said internal packaging material, said internal packaging material having a light transmittance from greater than 0% up to and including 57% with respect to light having a wavelength of 910 nm or shorter; and an external packaging material, which externally packages the planographic printing plates that have been internally packaged in said internal packaging material, and which is made of a material that acts as a buffer against charges in temperature and humidity occurring outside of the external packaging material in order to further protect the internally packaged planographic printing plates.

15. A packaging structure of planographic printing plates according to claim 14, wherein said external packaging material is made of corrugated cardboard.

* * * * *